United States Patent
Thompson et al.

(10) Patent No.: US 10,270,668 B1
(45) Date of Patent: Apr. 23, 2019

(54) IDENTIFYING CORRELATED EVENTS IN A DISTRIBUTED SYSTEM ACCORDING TO OPERATIONAL METRICS

(71) Applicant: Amazon Technologies, Inc., Seattle, WA (US)

(72) Inventors: James Michael Thompson, Seattle, WA (US); Marc Stephen Olson, Bellevue, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 687 days.

(21) Appl. No.: 14/665,878

(22) Filed: Mar. 23, 2015

(51) Int. Cl.
*H04L 12/24* (2006.01)
*H04L 29/08* (2006.01)

(52) U.S. Cl.
CPC .......... *H04L 41/5009* (2013.01); *H04L 67/10* (2013.01); *H04L 41/5032* (2013.01); *H04L 41/5067* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,702,779 B1 * | 4/2010 | Gupta | ........................ | G06F 9/50 709/220 |
| 8,364,460 B2 * | 1/2013 | Ostermeyer | ........ | G06F 17/5009 703/13 |
| 8,380,838 B2 * | 2/2013 | Bose | ........................ | H04L 41/50 709/223 |
| 8,396,961 B2 * | 3/2013 | Little | ...................... | G06F 9/466 709/201 |
| 8,418,000 B1 * | 4/2013 | Salame | ................... | H04L 67/10 714/26 |
| 8,631,401 B2 * | 1/2014 | Bansal | .................. | G06F 9/5011 718/1 |
| 8,707,194 B1 * | 4/2014 | Jenkins | ................. | H04L 67/025 715/772 |
| 8,738,972 B1 * | 5/2014 | Bakman | .............. | G06F 11/0712 714/47.1 |
| 8,977,886 B2 * | 3/2015 | Bauer | ................. | H04L 67/1097 714/4.1 |
| 9,047,348 B2 * | 6/2015 | Dayan | ................. | H04L 41/0631 |

(Continued)

FOREIGN PATENT DOCUMENTS

EP       2 801 909 A1 * 11/2014 .............. G06F 11/34

*Primary Examiner* — Patrice L Winder
(74) *Attorney, Agent, or Firm* — Robert C. Kowert; Meyertons, Hood, Kivlin, Kowert & Goetzel, P.C.

(57) ABSTRACT

A distributed system may implement identifying correlated events in a distributed system according to operational metrics. A distributed system may collect large numbers of operational metrics from multiple different sources. Some operational metrics may be monitored, analyzing the operational metrics for correlation with other operational metrics. The monitored operational metrics may be manually selected, or identified according to anomalous events detected for the operational metrics. Based on the monitoring, a correlated event may be detected. A response for the correlated event may be determined and performed. In some embodiments, a notification of the correlated event may be sent. Corrective actions may be performed at the distributed system, in some embodiments.

20 Claims, 8 Drawing Sheets

(56) References Cited

U.S. PATENT DOCUMENTS

| | | | |
|---|---|---|---|
| 9,148,354 B2* | 9/2015 | Johnsson | H04L 41/5038 |
| 9,197,653 B2* | 11/2015 | Kruglick | H04L 63/1416 |
| 9,250,974 B1* | 2/2016 | Estes | G06F 9/5072 |
| 9,298,525 B2* | 3/2016 | Zhu | G06F 11/0709 |
| 9,317,387 B2* | 4/2016 | Kariv | G06F 11/3003 |
| 9,356,883 B1* | 5/2016 | Borthakur | H04L 41/5025 |
| 9,454,294 B2* | 9/2016 | Sapuram | G06Q 30/0631 |
| 9,477,544 B2* | 10/2016 | Wu | G06F 11/079 |
| 9,485,159 B1* | 11/2016 | Sant'Anna | H04L 43/08 |
| 9,582,395 B2* | 2/2017 | Tuffs | G06F 11/3452 |
| 9,582,780 B1* | 2/2017 | Curcic | G06Q 10/0635 |
| 9,647,909 B2* | 5/2017 | Kuan | H04L 43/045 |
| 9,819,729 B2* | 11/2017 | Moon | H04L 67/10 |
| 2006/0031463 A1 | 2/2006 | Bird et al. | |
| 2008/0195369 A1* | 8/2008 | Duyanovich | G06F 11/0709 703/22 |
| 2009/0177692 A1 | 7/2009 | Chagoly et al. | |
| 2010/0088234 A1* | 4/2010 | Moore | G06F 21/62 705/52 |
| 2010/0205131 A1* | 8/2010 | Kumar | G06F 15/173 706/46 |
| 2010/0235836 A1* | 9/2010 | Bratanov | G06F 11/3466 718/1 |
| 2011/0041126 A1* | 2/2011 | Levy | G06F 9/5072 718/1 |
| 2012/0005433 A1 | 1/2012 | Thilagar et al. | |
| 2012/0054331 A1* | 3/2012 | Dagan | G06F 11/0712 709/224 |
| 2012/0054554 A1* | 3/2012 | Dagan | G06F 11/0712 714/39 |
| 2012/0290647 A1* | 11/2012 | Ellison | H04L 41/0233 709/203 |
| 2013/0097183 A1* | 4/2013 | McCracken | G06F 11/079 707/748 |
| 2013/0097304 A1* | 4/2013 | Asthana | H04L 41/5025 709/224 |
| 2013/0167185 A1* | 6/2013 | Lee | H04N 21/64322 725/109 |
| 2013/0179736 A1* | 7/2013 | Gschwind | G06F 11/3075 714/37 |
| 2013/0305093 A1* | 11/2013 | Jayachandran | G06F 11/0754 714/37 |
| 2013/0339515 A1 | 12/2013 | Radhakrishnan | |
| 2014/0019335 A1* | 1/2014 | MacDonald | G06Q 10/06 705/39 |
| 2014/0059395 A1* | 2/2014 | Mahindru | G06F 11/07 714/48 |
| 2014/0089493 A1* | 3/2014 | Bauer | G06F 9/5072 709/224 |
| 2014/0123129 A1* | 5/2014 | Risbood | G06F 8/61 717/176 |
| 2014/0165054 A1* | 6/2014 | Wang | G06F 9/45558 718/1 |
| 2014/0172371 A1* | 6/2014 | Zhu | G06F 11/0709 702/185 |
| 2014/0281739 A1* | 9/2014 | Tuffs | G06F 11/3452 714/47.2 |
| 2014/0297821 A1* | 10/2014 | Lvin | H04L 41/064 709/223 |
| 2014/0324862 A1* | 10/2014 | Bingham | G06F 17/30572 707/737 |
| 2014/0358833 A1* | 12/2014 | Biem | G06N 5/046 706/21 |
| 2014/0372513 A1* | 12/2014 | Jones | G06F 9/5072 709/203 |
| 2015/0081885 A1* | 3/2015 | Thomas | H04L 43/0876 709/224 |
| 2015/0195157 A1* | 7/2015 | Nayyar | H04L 43/0852 709/224 |
| 2015/0207696 A1* | 7/2015 | Zhang | H04L 41/5009 709/224 |
| 2015/0254158 A1* | 9/2015 | Puri | G06F 11/3476 714/37 |
| 2015/0269050 A1* | 9/2015 | Filimonov | G06F 11/3409 702/183 |
| 2015/0281011 A1* | 10/2015 | Gates | H04L 41/065 709/224 |
| 2015/0358391 A1* | 12/2015 | Moon | H04L 67/10 709/224 |
| 2016/0087859 A1* | 3/2016 | Kuan | H04L 43/0817 715/736 |
| 2016/0087861 A1* | 3/2016 | Kuan | H04L 43/065 709/224 |
| 2016/0094422 A1* | 3/2016 | Poola | H04L 43/045 709/224 |
| 2016/0103717 A1* | 4/2016 | Dettori | G06F 9/45558 719/318 |
| 2016/0224577 A1* | 8/2016 | Miller | G06F 17/30091 |
| 2016/0226731 A1* | 8/2016 | Maroulis | H04L 43/065 |
| 2017/0315842 A1* | 11/2017 | Lyan | G06F 9/4881 |

\* cited by examiner

IDENTIFYING CORRELATED EVENTS IN A DISTRIBUTED SYSTEM ACCORDING TO OPERATIONAL METRICS

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may be implemented across large and complex distributed systems which may include many different systems, services, applications, or devices to provide virtual computing resources. Operational metrics may be collected to understand the performance and overall health of these distributed systems. At a certain point, however, the complexity and amount of operational metrics collected can overwhelm those attempting to analyze portions of distributed system performance or performance overall.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement identifying correlated events in a distributed system according to operational metrics. Distributed systems may host various resources for performing or implementing different systems, services, applications and/or functions. The resources may be implemented to provide different network-based services located across multiple servers, systems, computing devices, and other computing resources. In order to maintain an understanding of the health and performance of the different services, operational metrics may be collected which may indicate the operation of various different portions of the services and/or the distributed system as a whole.

As the number of operational metrics grow, it becomes increasingly difficult to understand relations or dependencies among the different services. For instance, storage services may provide some functionality or role in other network-based services, such as storage for virtual computing resources or archive storage for database services. Changes in the performance of one of these services may impact dependent services. If these dependencies are difficult to detect, then failures and other system events that occur may be difficult to diagnose or analyze. Network failures or events may affect multiple services, for instance, as common communication channels may be utilized amongst network services, making it difficult to determine the source cause of network event. Identifying correlated events in a distributed system according to operational metrics may provide a way to dynamically detect correlated events in a distributed system, which may provide an automated way to discover hidden dependencies when problem solving failures or making changes, such as upgrades to different portions of the distributed system. For instance, identifying aberrant operational metrics of a correlated event may be traceable to a particular network service, or portion of a network service, for troubleshooting.

Figure 1:
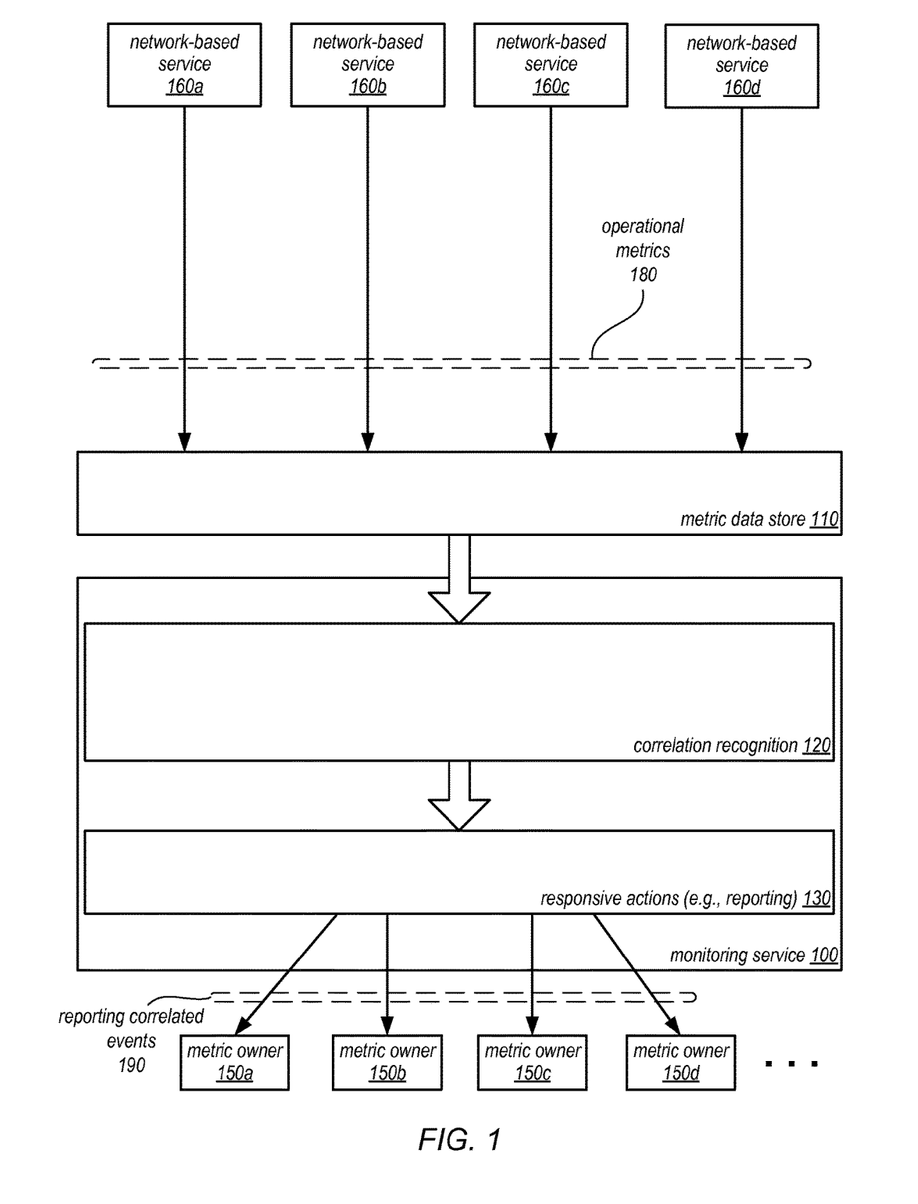
FIG. 1 illustrates a logical block diagram for identifying correlated events in a distributed system according to operational metrics, according to some embodiments.

FIG. 1 illustrates a logical block diagram for identifying correlated events in a distributed system according to operational metrics, according to some embodiments. Different network-based services 160 may report or publish operational metrics 180 to metric data store 110. Monitoring service 100 may access the metric data store to perform correlation recognition 120 upon the operational metrics and report correlated events 190 to metric owners 150.

As illustrated in FIG. 1, multiple network-based services, such as network-based services 160a, 160b, 160c, 160d, 160e and 160f may generate various operational metrics 180 as part of the performance of the respective services. Operational metrics 180 may, in various embodiments, be may include metrics reflecting the rates and types of requests received from clients, bandwidth utilized by such requests, system processing latency for such requests, system component utilization, utilization of systems, services, or devices rates and types of errors resulting from requests, characteristics of stored and requested data, services, operations, or any other suitable metrics which describe the operation of a portion of a network-based service. In various embodiments, these operational metrics 180 may be sent to data store 110 to be persistently stored as part of respective data sets.

Monitoring service 100 may monitor the operational metrics 180 reported to metric data store 110. For instance, select operational metrics may be identified and a correlation analysis performed to determine correlation amongst the identified metrics. Correlation measures, such as correlation coefficients or similarities scores may be calculated, in some embodiments to indicate the results of such an analysis. Based on the determined correlation, correlated events may be detected. A correlated event may, in various embodiments, be an event where two or more operational metrics are correlated for some period of time. Correlated events may indicate various information about a distributed system, such as failure scenarios or resource contention amongst different portions of the distributed system (e.g., contention between network-based services that utilize a common third network-based service). Correlated events may be different types of events, in some embodiments, which may be classified according to the operational metrics detected as correlated (e.g., correlated network operational metrics may classify a correlated event as a network event). As illustrated in FIG. 1, responsive actions may be performed for detected correlated events. For instance, a notification or report of a correlated event may be sent 190 to respective metric owners 150 of those operational metrics that are correlated. Other responsive actions, such as corrective actions to migrate resources, block or throttle behaviors, or some kind of behavior change amongst the network-based services may be performed. Some responsive actions may be based on the classification of the correlated event.

Please note that previous descriptions are not intended to be limiting, but are merely provided as an example of identifying correlated events. Various components may perform correlation analysis. Different numbers or types of services or sources of data may be analyzed to identify correlated resource behaviors.

This specification begins with a general description of a provider network, which may implement identifying correlated events in a distributed system according to operational metrics collected from one or more network-based services in the provider network. Then various examples of a monitoring service are discussed, including different components/modules, or arrangements of components/module that may be implemented and which may perform identifying correlated events in a distributed system according to operational metrics. A number of different methods and techniques to implement identifying correlated events in a distributed system according to operational metrics are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
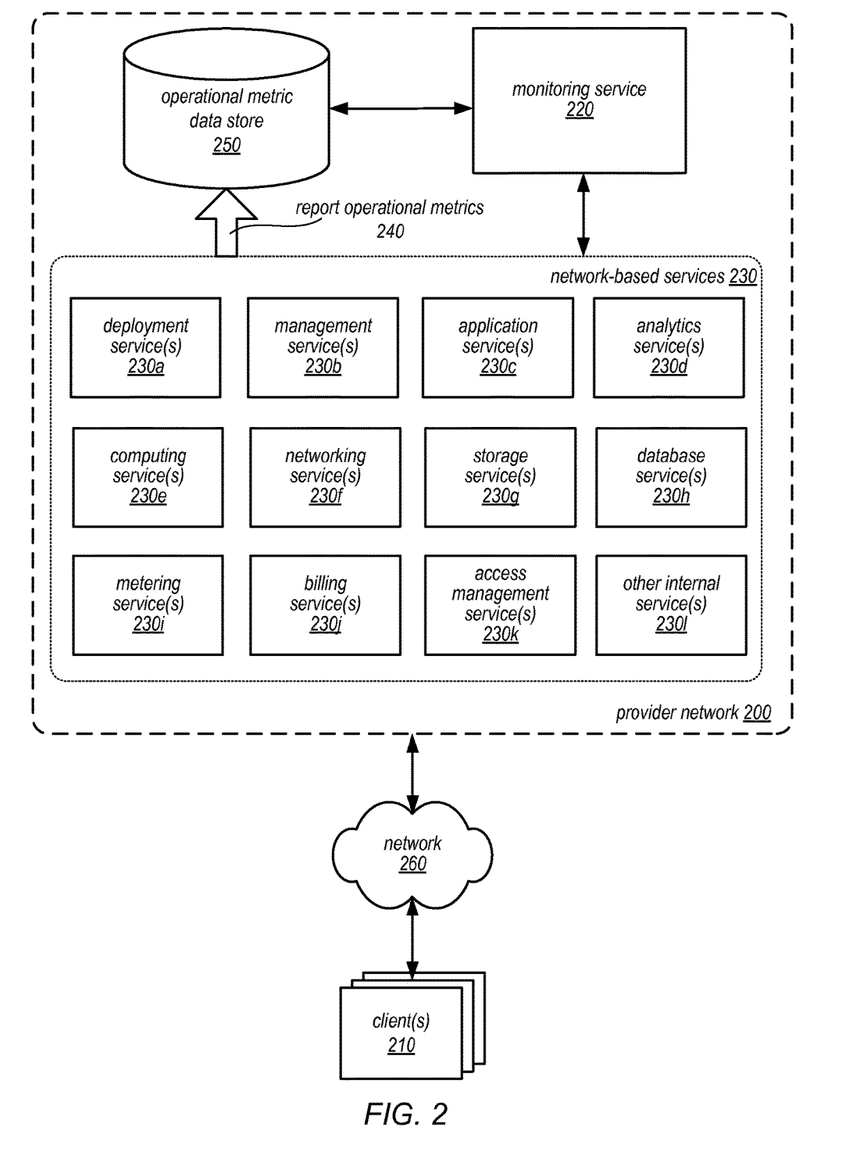
FIG. 2 is a block diagram illustrating a provider network that includes multiple network-based services including a monitoring service that implements identifying correlated events in a distributed system according to operational metrics, according to some embodiments.

FIG. 2 is a block diagram illustrating a provider network that includes multiple network-based services including a monitoring service that implements identifying correlated events in a distributed system according to operational metrics, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as computing service 230*e*, storage services 230*g*, such as a block-based storage service and other network-based services, such as those discussed below. Clients 210 may access these various services offered by provider network 200 via network 260. Likewise network-based services may themselves communicate and/or make use of one another to provide different services.

Provider network 200 may implement many different kinds of network-based services, and thus the following discussion of various services is not intended to be limiting. For example, various network-based services may be implemented such as deployment service(s) 230*a*, management service(s) 230*b*, application service(s) 230*c*, and analytic service(s) 230*d*. In some embodiments, provider network 200 may implement storage service(s) 230*g*. Storage service(s) 230*g* may be one or more different types of services that provide different types of storage. For example, storage service(s) 230*g* may be an object or key-value data store that provides highly durable storage for large amounts of data organized as data objects. In some embodiments, storage service(s) 230*g* may include an archive long-term storage solution that is highly-durable, yet not easily accessible, in order to provide low-cost storage.

In some embodiments, storage service(s) 230*g* may provide virtual block storage for other computing devices, such as compute instances implemented as part of virtual computing service 230*e*. A block-based storage service is a storage system, composed of a pool of multiple independent resource hosts, which provide block level storage for storing one or more sets of data volumes. Data volumes may be mapped or attached to particular client(s) (e.g., a virtual compute instance of virtual compute service 230*e*), providing virtual block-based storage (e.g., hard disk storage or other persistent storage) as a contiguous set of logical blocks. In some embodiments, a data volume may be divided up into multiple data chunks or partitions (including one or more data blocks) for performing other block storage operations, such as snapshot operations or replication operations. A volume snapshot of a data volume may be a fixed point-in-time representation of the state of the data volume. In some embodiments, volume snapshots may be stored remotely from a resource host maintaining a data volume, such as in another storage service. Snapshot operations may be performed to send, copy, and/or otherwise preserve the snapshot of a given data volume in another storage location, such as a remote snapshot data store in other storage service.

Access to data volumes may be provided over an internal network within provider network 200 or externally via network 260, in response to block data transaction instructions. A block-based storage service control plane may provide services related to the creation, usage and deletion of data volumes in response to configuration requests. In at least some embodiments, block-based storage service control plane may implement volume placement. A block-based storage service control plane may also provide services related to the creation, usage and deletion of volume snapshots on other storage services. A block-based storage service control plane may also provide services related to the collection and processing of performance and auditing data related to the use of data volumes and snapshots of those volumes.

In some embodiments, provider network 200 may implement database service(s) 230*h*. Database services 230*h* may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Provider network 200 may implement networking service(s) 230*f* in some embodiments. Networking service(s) 230*f* may configure or provide virtual networks, such as virtual private networks (VPNs), among resources implemented in provider network 200 as well as control access with external systems or devices. For example, networking service(s) 230*f* may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 230*f* may manage or configure the internal network for provider network 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

In some embodiments, provider network 200 may implement virtual computing service 230*e*, to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may implement components to coordinate the metering and accounting of client usage of network-based services, including network-based services 230*e*-230*l*, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s) 230*b*, or may maintain a database of usage data that may be queried and processed by external systems for reporting and billing of client usage activity. In certain embodiments, provider network 200 may implement components (e.g., metering service(s) 230a) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components (e.g., as part of monitoring service 220), while in other embodiments such metrics (or relevant portions of such metrics) may be exposed to clients to enable such clients to monitor their usage of network-based services.

In some embodiments, provider network 200 may implement components to implement user authentication and access control procedures, such as access management service(s) 230c, for provider network 200 resources. For example, for a given network-based services request to access a particular compute instance, provider network 200 may implement components configured to ascertain whether the client associated with the access is authorized to con-figured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

Network-based services implemented as part of provider network 200 may each implement respective programmatic interfaces, in some embodiments. For example, requests directed to virtual computing service 230e may be formatted according to an API for virtual computing service 230e, while requests to storage service(s) 230g may be formatted according to an API for storage service(s) 230g. Different portions of the various APIs may be exposed to external clients, in some embodiments, with some other portions remaining available to internal clients, such as other network-based services in provider network 200.

The operation network-based services 230 may, in various embodiments, generate operational metrics 240 which are sent to be stored in operational metric data store 250. Operational metrics, as discussed above, may include metrics reflecting the rates and types of requests received from clients 210, bandwidth utilized by such requests, system processing latency for such requests, system component utilization (e.g., network bandwidth and/or resource utilization within network-based services), utilization of systems, services, or devices (e.g., various aspects of server utilization, such as CPU, or IOPs) rates and types of errors resulting from requests, characteristics of stored and requested data, services, operations, or any other suitable metrics which describe the operation of a portion of a network-based service 230 or provider network 200. Various monitoring or collection agents may be implemented at different devices at different levels within the provider network to collect operational metrics.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume in a manner that is transparent to applications implement on the client 210 utilizing computational resources provided by the compute instance or block storage provided by the data volume.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
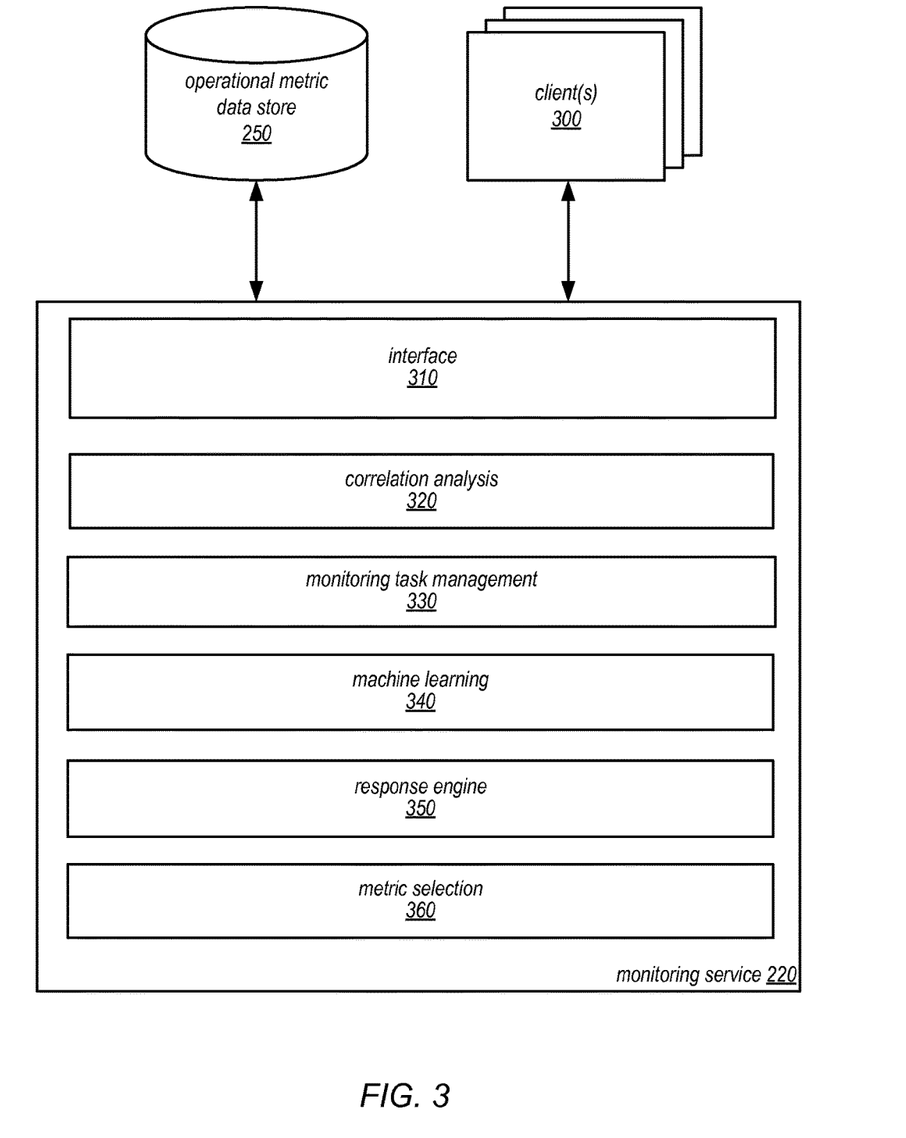
FIG. 3 is a logical block diagram illustrating a monitoring service that implements identifying correlated events in a distributed system according to operational metrics, according to some embodiments.

Provider network 200 may implement a monitoring service 220 to monitor the collected operational metrics and detect correlated events, in various embodiments. FIG. 3 is a logical block diagram illustrating a monitoring service that implements identifying correlated events in a distributed system according to operational metrics, according to some embodiments. Monitoring service 220 may implement interface 310 to interact with various client(s) 300, the operational metric data store 250, or any other systems, applications, or devices. Client(s) 300 may be internal or external clients with respect to the provider network and may perform various requests, such as those discussed below with regard to FIG. 4, to access monitoring service 220.

Figure 6:
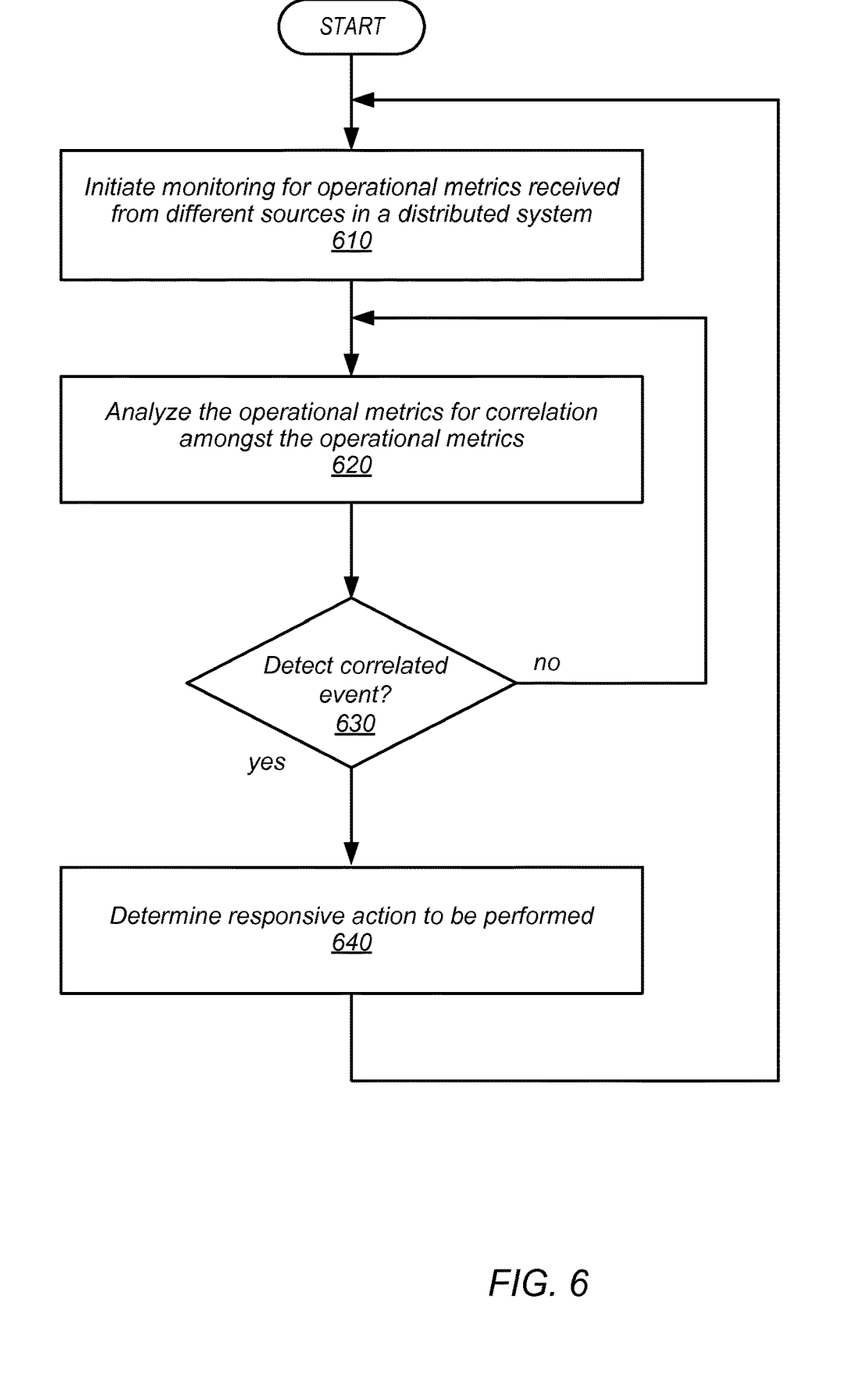
FIG. 6 is a high-level flowchart illustrating various methods and techniques for identifying correlated events in a distributed system according to operational metrics, according to some embodiments.

Monitoring service 320 may implement correlation analysis 320 to measure correlation amongst different operational metrics. For instance, as discussed below with regard to FIG. 6, select operational metrics may be identified for monitoring. Correlation measures, such as correlation coefficients, similarity scores, and other ways of indicating correlation may be determined between a metric and another one or more metrics. Based on the determined correlation, correlated events may be detected. For instance, correlation criteria may be implemented to identify whether or not the correlation measures are sufficient to indicate a correlated event (e.g., a threshold score or measurement may be implemented). FIG. 6, discusses in more detail below the various ways correlation analysis 320 may be performed. In at least some embodiments, machine learning 340 may be implemented to applying machine learning techniques to previously detected correlated events in order to improve correlation criteria used to detect correlated events.

Monitoring task management 330 may be implemented to allow clients to create, manage, modify and/or remove monitoring tasks, in some embodiments. For instance, a client may request that a monitoring task be created, so that certain operational metrics are monitored, or certain responsive actions are taken when correlated events are detected. Monitoring task management 330 may interact with other components to perform monitoring tasks. For instance, metric selection 360 may provide automated selections of operational metrics to include in monitoring, ins some embodiments (e.g., such as identifying operational metrics with anomalous events as discussed below with regard to FIG. 7). In some embodiments, client(s) 300 may select, request, or identify operational metrics for monitoring, such as discussed below with regard to FIG. 4. Monitoring task management 330 may interact with response engine 350 to determine the appropriate responsive action to take, for instance, if a responsive action has not already been specified in the monitoring task. For example, response engine 350 may classify a detected correlated event as a particular type of correlated event (e.g., network partition or disruption, power loss, increased demand, or any other possible cause for a correlated event) in order to select a corresponding responsive actin mapped to the type of correlated event.

Figure 4:
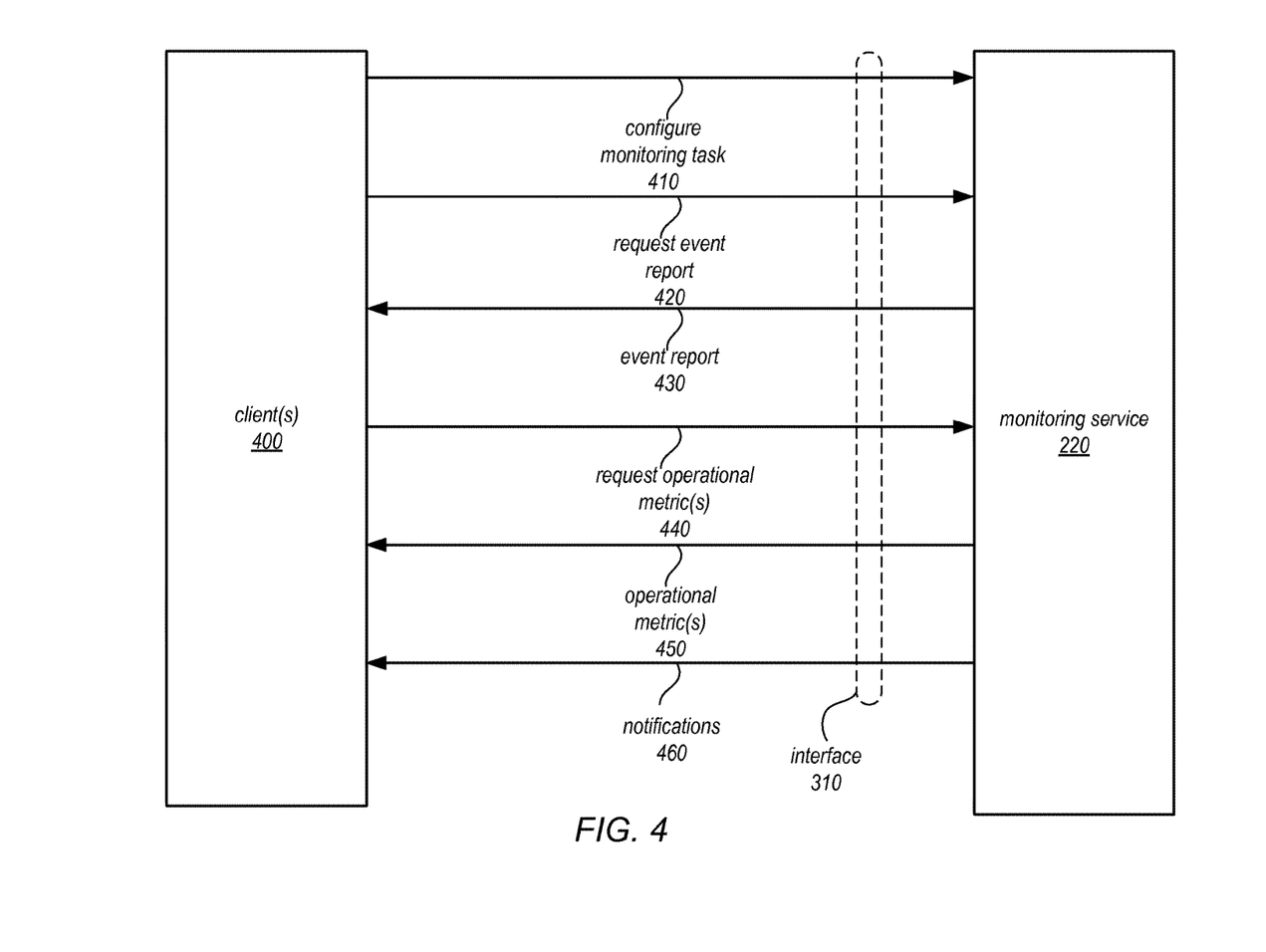
FIG. 4 is a logical block diagram illustrating interactions between clients and a monitoring service, according to some embodiments.

FIG. 4 is a logical block diagram illustrating interactions between clients and a monitoring service, according to some embodiments. Client(s) 400 may be an internal client to provider network (e.g., another control plane component of the provider network, or another service, system, or device of the provider network) or a client external to a provider network (e.g., a metric owner, service operator or agent) which may access the monitoring service, and obtain information about detected correlated events, in some embodiments.

A request to configure a monitoring task 410 may be received via interface 310 at monitoring service 220. Configuring a monitoring task 410 may include various specifications about what operational metrics are to be monitored, how the operational metrics are to be monitored, and what responsive actions may be taken in the event of a correlated event, in some embodiments. For instance, the request 410 may identify operational metrics by name, identifier, and/or source to be monitored as part of a monitoring task. In some embodiments, the request may indicate that the monitoring task is to automatically select operational metrics for monitoring (e.g., based on the detection of anomalous events, such as discussed below with regard to FIG. 7). The request 410 may provide thresholds or criteria for detecting anomalous events (e.g., delimiting 20% deviations from an average or normal operational metric level as anomalous). The specific responsive actions taken, notification of metric owners, corrective actions (e.g., throttling operations, blocking operations, rolling back changes, etc.) may be identified in the request 410.

In some embodiments, a request for an event report 420 may be received via interface 310 at monitoring service 220. For example, an event report may be generated for a detected correlated event and may include various information about the detected event, such as historical and descriptive data for an event, such as the specific timeframe during which the event occurred, the sources of the correlated operational metrics, responsive actions taken, the classification of the detected event, and the type of operational metrics that were correlated. The report may be generated on demand at monitoring service or may be generated, stored, and retrieved when a request 420 is received. The requested event report may be provided 430, either via a graphical interface, file or data transfer, or other communication of the report information.

In some embodiments, requests for information about specific operational metric(s) 440 may be received via interface 310 at monitoring service 220. For instance, a request for the previous 24 hours of a network metric for servers in particular service may be requested. As with the report discussed above, the operational metric(s) may be provided 450 either via a graphical interface, file or data transfer, or other communication of the metric(s) information.

As illustrated in FIG. 4, notifications 460 may be sent from monitoring service 220 to client(s) to indicate the detection of a correlated event at monitoring service, in some embodiments. For example, metric owners and/or other interested parties may pre-register communication methods (e.g., email address, message board, accessible data store, or any other location accessible to received and retrieve a notification). The notification may contain various information about the detected correlated event, such as a correlation event identifier which may be used to lookup event details at an interface (discussed below with regard to FIG. 5) or a link to a user interface to describe the correlated event (e.g., a hyperlink to a network-based site providing an interface view correlated event details). Other information, such as the various information that may be included in a report may be included in the notification 460, such as historical and descriptive data for an event, such as the specific timeframe during which the event occurred, the sources of the correlated operational metrics, the classification of the correlated event, responsive actions taken, and the type of operational metrics that were correlated. Recommendation actions may also be included in the notification in some embodiments.

Figure 5:
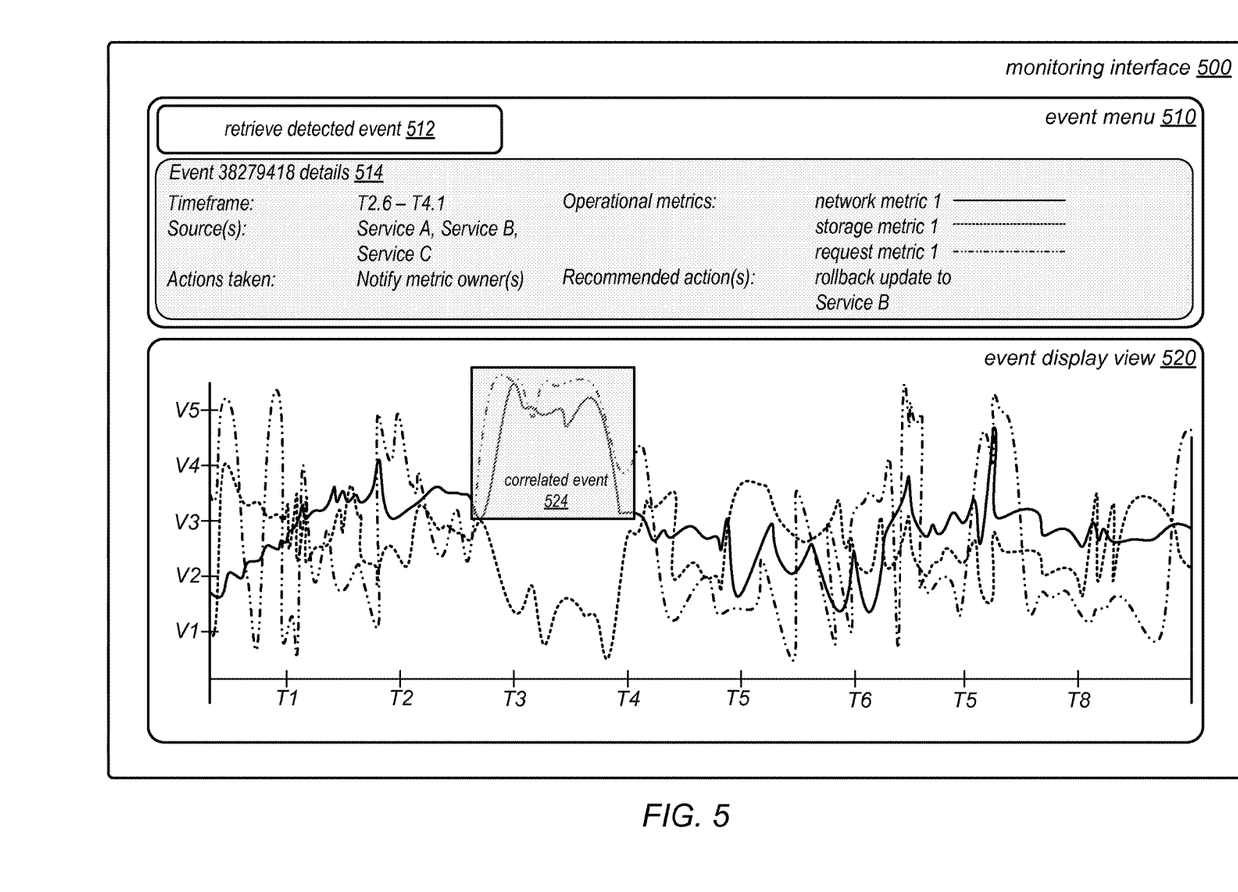
FIG. 5 is an example graphical user interface for a monitoring service to provide a view of a correlated event, according to some embodiments.

FIG. 5 is an example graphical user interface for a monitoring service to provide a view of a correlated event, according to some embodiments. Monitoring interface 500 may be implemented to provide a graphical or visual presentation of detected correlated events, in some embodiments. Event menu element 510 may provide an event lookup or retrieval mechanism 512. For instance, a notification or other indication provided to a metric owner may include an event identifier or other indication of how to retrieve data from the detected event. The event identifier may be input into retrieve detected event element 512 to display a graphical representation of the correlated event and other event details.

For instance, details for correlated event 38279418 may be retrieved and displayed in element 514. Event details 514 may include historical and descriptive data for an event, such as the specific timeframe during which the event occurred, the sources of the operational metrics (e.g., services A, B, and C), responsive actions taken (e.g., notify metric owner(s)), and the type of operational metrics (e.g., network metric 1, storage metric 1, and request metric 1). In some embodiments, monitoring service 220 may provide a recommended action to alleviate or prevent the correlated event from reoccurring (e.g., performing a rollback of a particular update to Service B). Monitoring service 220 may interact with other services, such as configuration management services, change logs, or other information to identify changes made prior to a correlated event.

As illustrated in FIG. 5, the operational metrics may be graphically illustrated in event display vie 520. For instance, a time series graph of each metric may be imposed in the same space with a highlighted portion indicating the timeframe and metrics of the correlated event 524. In some embodiments, event display view 520 may be interactive, allowing further metrics to be superimposed (even if not detected as part of the correlated event) for further analysis. For instance, the dotted line metric below the highlighted correlated event may illustrate a metric (e.g., storage metric 1) which is not a part of correlated event 524. Portions of the event display view may be selected, highlighted, or otherwise indicated to trigger a request to perform a correlation analysis or other analysis upon a different portion of the operational metrics that are displayed. In at least some embodiments, anomalous events detected for individual operational metrics may be denoted.

Please note that FIG. 5 is provided merely as an example of a graphical monitoring interface, and thus neither FIG. 5 nor the accompanying discussion is intended to be limiting as to other interfaces that may be implemented to provide information about detected correlated events.

In some instances, the operations, functions, tasks, or otherwise behaviors of the resources of a distributed system may be implemented as part of coordinated, related, directed, or predetermined activities, resulting in an impact on a distributed system that is greater than the individual effects of behaviors exhibited by resources. For instance, different resources may be similarly configured to perform a backup operation at same or similar time of day, increasing the burden on those portions of the distributed system involved in the backup operation (e.g., back up storage servers). By predicting such correlated behaviors, allocation decisions for resources in a distributed system may be made so as to compensate for the impact of correlated behaviors. FIG. 6 is a high-level flowchart illustrating various methods and techniques for identifying correlated events in a distributed system according to operational metrics, according to some embodiments. These techniques may be implemented using a monitoring service as described above with regard to FIGS. 2-5, as well as other services and/or different implementations of a system, component, application, or device that identifies correlated events in a distributed system, and thus is not intended to be limiting as to the other types or configurations of systems that may implement the described techniques.

As indicated at 610, monitoring for operational metrics received from different resources in a distributed system may be received. Operational metrics, as noted earlier, may include metrics reflecting the rates and types of requests received from clients of a distributed system (e.g., requests to perform various operations, functions, or tasks provided by the distributed system, such as database access, operate virtual compute instances, perform different data analyses, etc.), bandwidth utilized by such requests, system processing latency for such requests, system component utilization (e.g., network bandwidth and/or resource utilization within network-based services), utilization of systems, services, or devices (e.g., various aspects of server utilization, such as CPU, or IOPs) rates and types of errors resulting from requests, characteristics of stored and requested data, services, operations, or any other suitable metrics which describe the operation of a portion of a distributed system. The operational metrics to be monitored may, in some embodiments, be manually selected (e.g., such as receiving a request to monitor the operational metrics which specifies particular network metrics, like a number of dropped packets, latency, bandwidth utilization, or uptime). In some embodiments, the selected operational metrics to be monitored may be automatically or dynamically identified, such as according to the detection of anomalous events discussed below with regard to FIG. 7.

As indicated at 620, a correlation analysis may be performed to determine correlation amongst the operational metrics. For example, comparison of time series data may be performed to calculate correlation measures. Various other comparisons, such as Pearson's correlation coefficient determinations or rank correlation determinations may be made. As indicated at 630, a correlated event may be detected based on the analysis for correlation amongst the operational metrics. For example, correlation measures, such as correlation coefficients, similarity scores, or other indicators of correlation may be calculated. Correlation criteria may be imposed which provide a heuristic for determining whether or not operational metrics during a particular timeframe were correlated. A score or coefficient threshold may be implanted, which if exceed for two or more operational metrics, a correlated event may be detected. In some embodiments, machine learning technique(s) may be applied to evaluate previously detected correlated events, in some embodiments. For example, a feature selection algorithm may be implemented to determine if current correlation criteria should be modified, updated, and/or replaced which would increase the accuracy of correlated operational metric identifications (e.g., minimize the error of false negatives). Pattern recognition, such as different classification or clustering techniques may be implemented to determine appropriate weights for different correlation criteria (e.g., increase or decrease weight of tag similarity vs. action similarity). As many other machine learning techniques may be implemented, the previous examples are not intended to be limiting. The results of machine learning evaluations may be used to alter how correlated operational metrics are identified. For example, the correlation criteria may be updated according to the machine learning evaluation of the results of correlation identification between the resources, in some embodiments.

As indicated at 640, responsive action to be performed may be determined. A responsive action may be action taken to notify, describe, or correct a correlated event. Notifications may be sent which may indicate the detected correlated event, such as discussed above with regard to FIG. 4. Similarly, reports may be generated and subsequently provided which describe the detected correlated event. In at least some embodiments, corrective actions may be performed at the distributed system. A corrective action may be an action to change the behavior of the distributed system with respect to the detected correlated behavior. For instance, certain operations, requests, services may be throttled. Some operations may be blocked, paused, or shut down until the correlated event is over.

Determining the responsive action to be performed may be achieved in many ways. For instance, rule sets, responsive plans, or other information may be maintained which prescribes responsive action(s) to be taken with respect to a particular correlated event. In at least some embodiments, correlated events may be one of many different types of correlated events (e.g., type of effected resource, such as network, storage, compute capacity, a particular service or system failure, etc.). Assigned or mapped responsive actions may correspond to the different types of correlated events. Detected correlated events may be classified, in various embodiments, according to the correlated metrics used to detect the correlated event. Classification criteria (which may be the various rule sets, responsive plans, or other information mentioned earlier) may be applied to identify the type of correlated event. For instance, various network metrics may be evaluated according to the classification criteria to classify the correlated event as a network partition. In at least some embodiments, machine learning techniques, as discussed earlier, may be similarly applied to update classification criteria for classifying correlated events.

Figure 7:
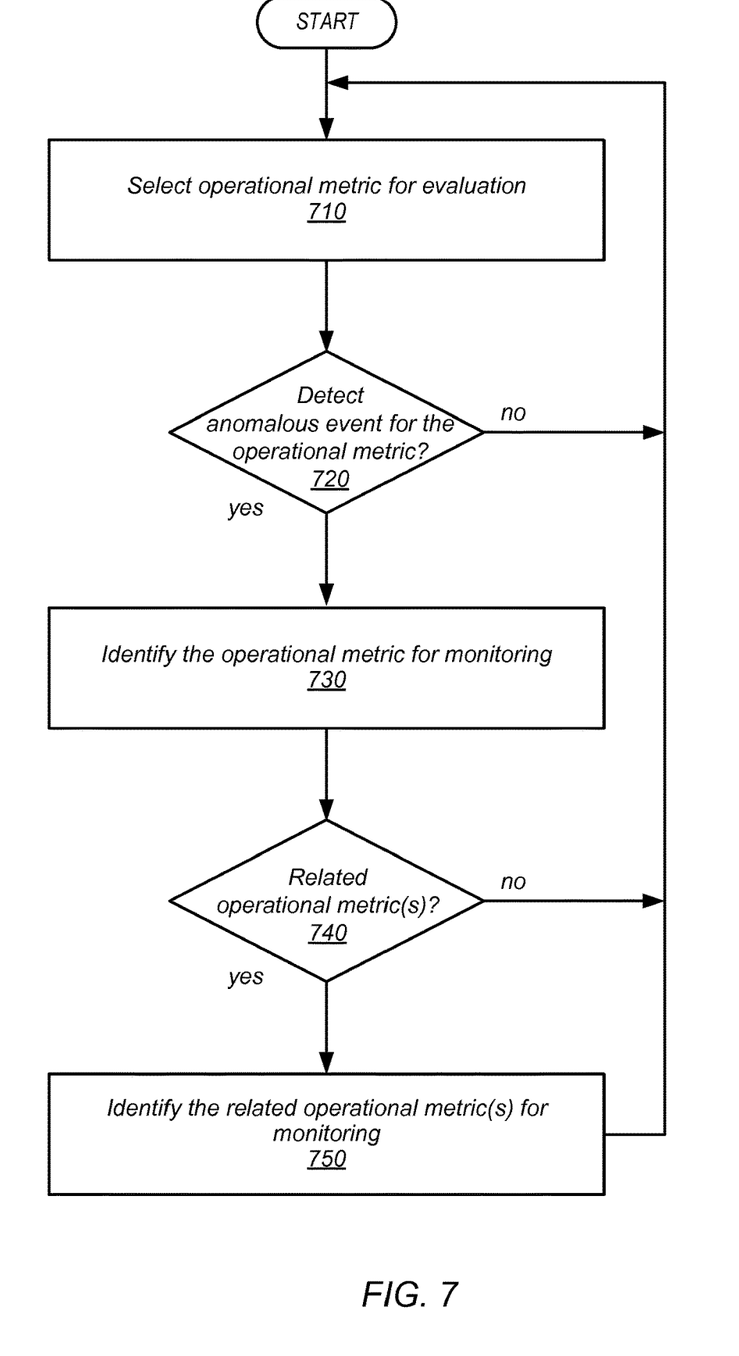
FIG. 7 is a high-level flowchart illustrating various methods and techniques for selecting operational metrics to monitor for correlation, according to some embodiments.

As noted above, selecting operational metrics to monitor for correlated events may be manually performed. A client, for example, may submit a request to monitor one or more operational metrics, identify a source of operational metrics for monitoring. Considering the large number of metrics that may potentially be monitored, it may be difficult to manually determine which particular operational metrics should be considered for monitoring. Automated techniques to select operational metrics for monitoring may allow a monitoring technique as described above with regard to FIG. 6 dynamically adapt to changing conditions that instigate correlated events. FIG. 7 is a high-level flowchart illustrating various methods and techniques for selecting operational metrics to monitor for correlation, according to some embodiments.

As indicated at 710, an operational metric may be selected for evaluation, in various embodiments. For instance, a sweep of currently collected operational metrics may be performed to consider each operational metric for inclusion in monitoring for correlated events. In some embodiments, certain types of operational metrics may be filtered out. Consider an operational metric that does not update very frequently, such as time since last manual reboot. The smaller data set maintained for an infrequently updated operational metric may make correlation analysis difficult, and may be prone to false positive correlation identification. Thus, the infrequently updated operational metric may not be considered for inclusion in monitoring.

As indicated at 720, a determination may be made as to whether an anomalous event is detected for the operational metric, in some embodiments. An anomalous event for an operational metric may be detected based on user-defined threshold(s) or criteria, in at least some embodiments. A user may, for instance, configure one or more alarms, triggers, or thresholds for a particular operational metric which may define a range of "normal" behavior. Deviation from the normal behavior as defined by the alarms, triggers, or thresholds may signal that an anomalous event with respect to the operational metric is occurring/has occurred. An anomalous event for an operational metric may be detected dynamically, on-the-fly, without user-defined thresholds or criteria, in some embodiments. For example, a time series forecasting technique may be applied to a time series of the operational metric, to determine whether the operational metric is deviating/has deviated/will deviate from "normal" behavior. Please note that time series forecasting is providing as an example of anomalous event recognition for an operational metric, and is not intended to be limiting. Other techniques to model "normal" operational metric behavior versus anomalous behavior may be implemented. The detection of an anomalous event may, in some embodiments, examine a certain period of time to detect an anomalous event (e.g., past 30 minutes). Data outside the period of time may not be considered (e.g., old or newer data).

As indicated by the positive exit from 720, if an anomalous event is detected for the operational metric, then the operational metric may be identified for monitoring, as indicated at 730, in various embodiments. For instance, the operational metric may put on a watch list, inserted into a current or new monitoring task, or otherwise made known to a monitoring system, component, or device. If no anomalous event is detected for the operational metric, then as indicated by the negative exit from 720, another operational metric may be selected for evaluation. As discussed above, a sweep of operational metrics may be periodically be made, and thus even if no anomalous event is detected for an operational metric in a current evaluation, the operational metric may be periodically evaluated such that an anomalous event that starts or is completed in between evaluations may be detected at a next evaluation.

In at least some embodiments, other operational metric(s) may be known to be related to an identified operational metric. For instance, if a certain type of networking operational metric is detecting an anomalous event, then other network operational metrics may be identified as related. Related operational metric(s) may also be identified for monitoring, as indicated at 750. In this way, a blast radius or other scope of anomalous behavior at multiple different sources of operational metric data may be anticipated if related operational metric(s) are also monitored.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 8:
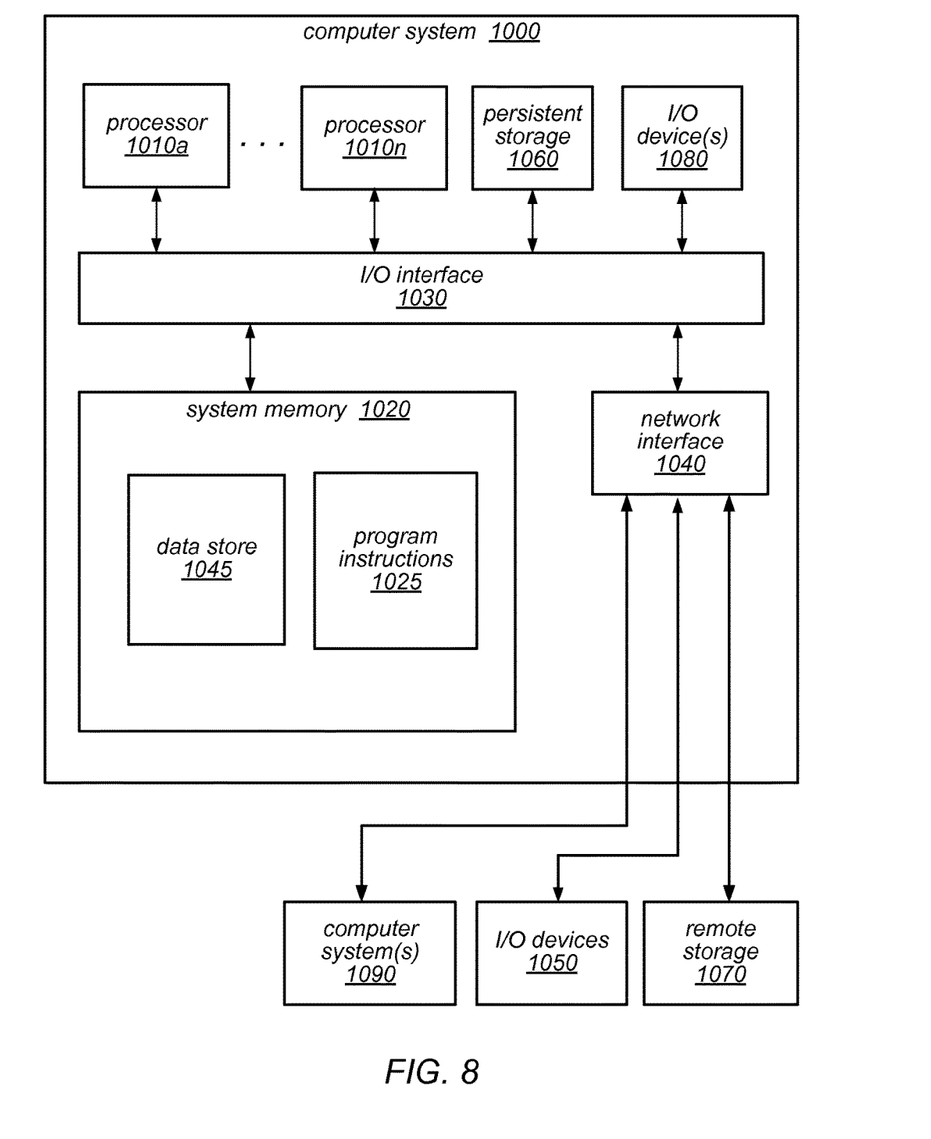
FIG. 8 is a block diagram illustrating an example computing system, according to some embodiments.

Embodiments of identifying correlated events in a distributed system as described herein may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a plurality of computing nodes of a distributed system of a service provider that implements a plurality of network-based services of a provider network that provides the network-based services for multiple clients of the service provider, the plurality of network-based services comprising:
        a monitoring service to monitor other network-based services of the plurality of network-based services, the monitoring service configured to:
            collect data values for a plurality of operational metrics from the other network-based services, wherein the operational metrics indicate operation of the network-based services provided for the clients or operation of the distributed system as a whole;
            evaluate at least some of the data values for the operational metrics to determine one or more measures of correlation amongst the operational metrics;
            detect, based at least in part on a particular measure of correlation between two or more of the operational metrics exceeding a threshold value, a correlated event at the network services; and
            perform, based on the detected correlated event, a responsive action with respect to the correlated event.

2. The system of claim 1, wherein the responsive action is to send a notification of the correlated event to respective owners of the two or more operational metrics.

3. The system of claim 1, wherein the monitoring service is further configured to receive a request to monitor the operational metrics.

4. The system of claim 1, wherein one of the two or more operational metrics is collected from a different network-based service than another of the two or more operational metrics.

5. A method, comprising:
    performing, by one or more computing devices of a service provider:
        monitoring data values of a plurality of operational metrics collected from a plurality of sources in a distributed system that implements a plurality of network-based services for multiple clients of the service provider, wherein the operational metrics indicate operation of the network-based services provided for the clients or operation of the distributed system as a whole, monitoring comprising:
            analyzing the data values of the operational metrics for one or more measures of correlation amongst the operational metrics;
            based, at least in part, on a particular one of the one or more measures of correlation amongst the operational metrics exceeding a threshold value, detecting a correlated event at the distributed system; and
            determining a responsive action to perform with respect to the correlated event.

6. The method of claim 5, further comprising identifying at least one of the operational metrics monitored in response to detecting an anomalous event for the at least one operational metric.

7. The method of claim 6, wherein detecting the anomalous event for the at least one operational metric comprises applying time series forecasting to a time series of the at least one operational metric.

8. The method of claim 5, further comprising receiving a request to monitor at least one of the operational metrics, wherein the request identifies the responsive action to perform.

9. The method of claim 5, wherein the responsive action is to send a notification of the correlated event to respective owners of the operational metrics that correspond to the measure of correlation that exceeded the threshold value.

10. The method of claim 5, wherein determining the responsive action comprises:
   classifying the correlated event as a particular type of correlated event according at least one of the plurality of operational metrics; and
   identifying the responsive action according to the particular type of a correlated event out of a plurality of responsive actions.

11. The method of claim 5, wherein the responsive action is a corrective action to be performed at the distributed system.

12. The method of claim 5, further comprising:
   applying one or more machine learning techniques to evaluate previously detected correlated events;
   based, at least in part, on the evaluation of the previously detected correlated events, updating correlation criteria for detecting correlated events;
   wherein the updated correlation criteria is applied for detecting the correlated event at the distributed system.

13. The method of claim 5, wherein the distributed system is a provider network, wherein the plurality of sources are a plurality of network-based services, and wherein one of the operational metrics that corresponds to the measure of correlation that exceeded the threshold value is collected from a different network-based service than another of the operational metrics that correspond to the measure of correlation that exceeded the threshold value.

14. A non-transitory, computer-readable storage medium, storing program instructions that when executed by one or more computing devices cause the one or more computing devices to implement:
   monitoring data values of a plurality of operational metrics collected from a plurality of network-based services of a distributed system of a provider network that provides the network-based services for multiple clients of the service provided, wherein the operational metrics indicate operation of the network-based services provided for the clients or operation of the distributed system as a whole, monitoring comprising:
      analyzing the data values of the operational metrics for one or more measures of correlation amongst the operational metrics;
   based, at least in part, on a particular one of the one or more measures of correlation amongst the operational metrics exceeding a threshold value, detecting a correlated event at the distributed system; and
   determining a responsive action to perform with respect to the correlated event.

15. The non-transitory, computer-readable storage medium of claim 14, wherein the program instructions cause the one or more computing devices to implement identifying at least one of the operational metrics monitored in response to detecting an anomalous event for the at least one operational metric.

16. The non-transitory, computer-readable storage medium of claim 15, wherein, in detecting the anomalous event, the program instructions cause the one or more computing devices to implement evaluating the at least one operational metric with respect to one or more user-defined thresholds.

17. The non-transitory, computer-readable storage medium of claim 14, wherein the responsive action is a corrective action performed at the distributed system.

18. The non-transitory, computer-readable storage medium of claim 14, wherein the responsive action comprises generating a report of the correlated event for subsequent retrieval.

19. The non-transitory, computer-readable storage medium of claim 14, wherein the program instructions cause the one or more computing devices to further implement providing two or more operational metrics of the detected correlated event via graphical user interface.

20. The non-transitory, computer-readable storage medium of claim 14, wherein one of the operational metrics of the detected correlated event is collected from a different network-based service than another of the two or more operational metrics of the detected correlated event.

* * * * *